UNITED STATES PATENT OFFICE.

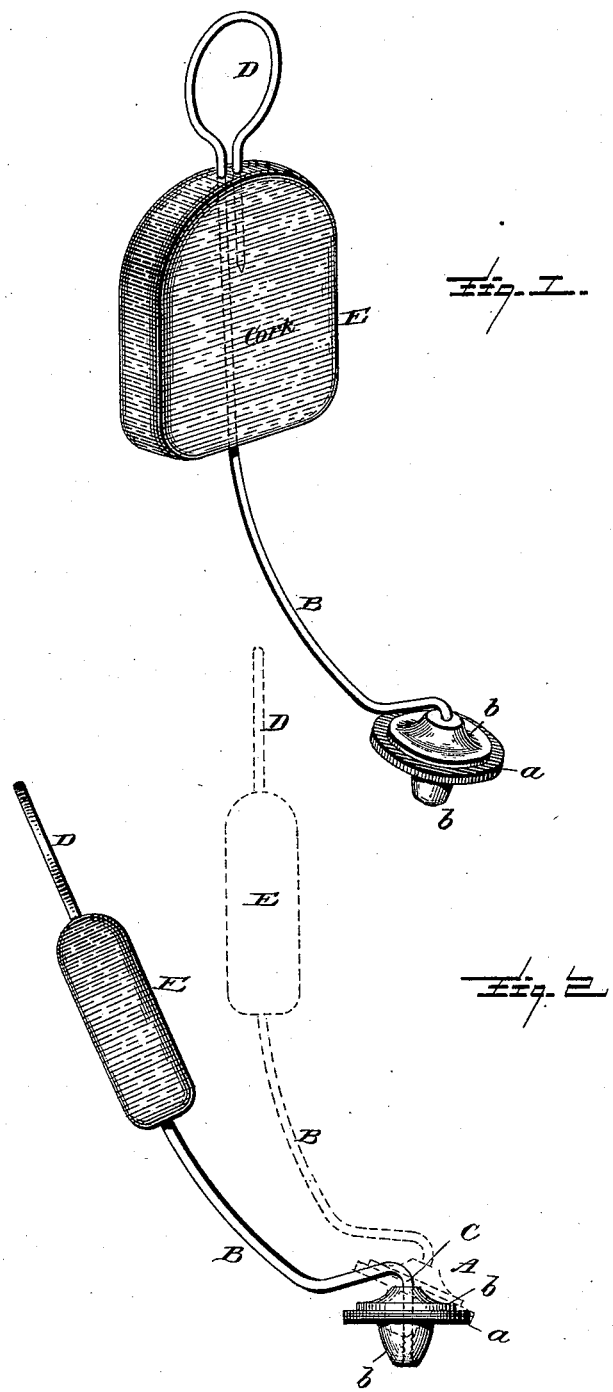

DANIEL FRANCIS JONES, OF SAN FRANCISCO, CALIFORNIA.

SAFETY-PLUG FOR WASH-BASINS.

SPECIFICATION forming part of Letters Patent No. 426,939, dated April 29, 1890.

Application filed December 14, 1889. Serial No. 333,703. (No model.)

*To all whom it may concern:*

Be it known that I, DANIEL FRANCIS JONES, a citizen of the United States, residing at San Francisco, in the county of San Francisco and State of California, have invented certain new and useful Improvements in Safety-Plugs for Wash-Basins; and I do hereby declare that the following is a full, clear, and exact description of the same, reference being had to the annexed drawings, making a part of this specification, and to the letters of reference marked thereon.

This invention relates to certain new and useful improvements in safety-plugs for wash-basins and the like; and it has for its object to provide a simple attachment to wash-basins, whereby they are automatically prevented from overflowing, no matter if the overflow-outlet becomes stopped up. I provide a plug attached to a float by means of a lever, and so arranged that as the water gets to a predetermined level the float will cause the lever to tilt the plug, and thus allow of the escape of the water from the bowl.

The novel features and the advantages of the invention will be hereinafter made apparent, and specifically defined by the appended claims.

The invention is clearly illustrated in the accompanying drawings, which, with the letters of reference marked thereon, form a part of this specification, and in which—

Figure 1 is a perspective view of my improved attachment. Fig. 2 is a side view illustrating in dotted lines the movement of the parts as the float is raised.

Like letters of reference indicate like parts in both figures of the drawings.

Referring now to the details of the drawings by letter, A designates a plug of any known construction, preferably, however, as shown in the drawings, with a rubber or analogous disk a confined between two metallic portions b, the lower portion being tapered to adapt it to readily fit the outlet-opening in the bottom of the bowl.

B is a lever or arm, provided at its lower end with a vertical portion C, which passes through the two metallic portions and the disk of the plug, and is screw-threaded to engage a screw-thread in the tapered portion of the plug, and thus serve to hold all the parts together. This arm or lever is curved, as shown in the drawings, and at its upper end is formed into an eye D, the end of the lever being extended downward parallel with the body portion thereof, and upon the two parallel portions there is placed a float E, preferably of cork, in the shape shown—that is, a flat substantially rectangular piece, the upper face of which may be rounded, as shown in Fig. 1. This cork is adjustable upon the lever, so as to adjust the same to cause the device to operate sooner or later, as may be desired.

In operation the plug is placed in the opening in the bottom of the bowl and water admitted. The plug will remain in the position in which it is shown in full lines in Fig. 2 till the water has risen to such a distance as to raise the float, when the parts will assume the position in which they are shown in dotted lines in Fig. 2, thus allowing the water to escape. When sufficient water has escaped to allow the float to drop, the plug will again seat itself in its hole, as before.

What I claim as new is—

1. The combination, with the plug consisting of the three parts, the rubber disk a and two metallic portions b, the lower one being conical, of the lever having one end passed through the three parts of the plug and screw-threaded into the conical portion b and securing them together, and the float on said lever, substantially as shown and described.

2. The combination, with the plug, of the lever B, having vertical portion at its lower end secured in said plug, curved above the plug, and at its upper end formed into an eye, the end being bent downward parallel with the body portion of the lever, and a cork float secured on the upper end of the lever on the two parallel portions thereof below the eye, substantially as shown and described.

In testimony that I claim the above I have hereunto subscribed my name in the presence of two witnesses.

DANIEL FRANCIS JONES.

Witnesses:
LEOPOLD ENGLANDER,
JNO. F. LYONS.